(12) United States Patent
Leibman

(10) Patent No.: US 10,494,753 B2
(45) Date of Patent: Dec. 3, 2019

(54) WATER VALVE WITH AUXILIARY PORT FOR A WASHING MACHINE APPLIANCE

(71) Applicant: Haier US Appliance Solutions, Inc., Wilmington, DE (US)

(72) Inventor: Alexander B. Leibman, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 191 days.

(21) Appl. No.: 15/725,453

(22) Filed: Oct. 5, 2017

(65) Prior Publication Data

US 2019/0106830 A1 Apr. 11, 2019

(51) Int. Cl.
| | |
|---|---|
| *D06F 39/08* | (2006.01) |
| *F16K 27/00* | (2006.01) |
| *D06F 39/12* | (2006.01) |
| *F16K 11/22* | (2006.01) |
| *D06F 23/04* | (2006.01) |

(52) U.S. Cl.
CPC ............ *D06F 39/088* (2013.01); *D06F 39/12* (2013.01); *F16K 11/22* (2013.01); *F16K 27/003* (2013.01); *D06F 23/04* (2013.01)

(58) Field of Classification Search
CPC ........ D06F 39/088; D06F 39/12; D06F 23/04; F16K 11/22; F16K 11/24; F16K 27/003
USPC .......................................................... 68/207
See application file for complete search history.

(56) References Cited

U.S. PATENT DOCUMENTS

| | | | |
|---|---|---|---|
| 4,790,346 A | * | 12/1988 | Kolze ..................... F16K 29/00 137/331 |
| 5,313,985 A | | 5/1994 | Donner |
| 5,996,603 A | | 12/1999 | Dupler |
| 2016/0102425 A1 | | 4/2016 | Scheckelhoff |

\* cited by examiner

*Primary Examiner* — Michael E Barr
*Assistant Examiner* — Tinsae B Ayalew
(74) *Attorney, Agent, or Firm* — Dority & Manning, P.A.

(57) ABSTRACT

Water valves for washing machine appliances are provided that include one or more auxiliary ports that include features that allow for accessories, e.g., a spray hose assembly or garden hose, to readily connect to the water valve of the washing machine appliance.

16 Claims, 9 Drawing Sheets

WATER VALVE WITH AUXILIARY PORT FOR A WASHING MACHINE APPLIANCE

FIELD OF THE INVENTION

The present disclosure relates generally to washing machine appliances, and more particularly to accessories for washing machine appliances.

BACKGROUND OF THE INVENTION

Washing machine appliances generally include a tub for containing wash fluid, e.g., water and detergent, bleach, and/or other fluid additives. A basket is rotatably mounted within the tub and defines a wash chamber for receipt of articles for washing. During operation of such washing machine appliances, wash fluid is directed into the tub and onto articles within the wash chamber of the basket. The basket and/or an agitation element can rotate at various speeds to, e.g., agitate articles within the wash chamber, wring wash fluid from articles within the wash chamber, etc.

Fluid additives may be provided to the wash fluid via a dispenser cup. For example, a user may pour a predetermined amount of detergent, fabric softener, or bleach into the dispenser cup, which may then be provided to the tub, wash basket, or both during operation of the washing machine appliance. However, through continuous use, the dispenser cup may build up an undesirable amount of residue from one or more of the fluid additives. The user may be required to remove the dispenser cup, transport the dispenser cup to, e.g., a kitchen sink, and manually wash the dispenser cup in order to remove the undesired residue.

Moreover, in certain situations, the user may have an article to be washed with one or more stains requiring pretreatment activities before washing in the washing machine appliance. Such pretreatment activities can include, e.g., wetting the article, scrubbing the article, etc. Accordingly, the user may again be required to transport the article to, e.g., a kitchen sink, in order to perform certain pretreatment activities on the article.

In addition, it may be desirable to wash a pet or to fill a bucket with water. However, many times all of the available water source spigots and/or connectors are connected to the washing machine appliance via fluid conduits. Accordingly, in some instances, there is no readily available place to connect a garden hose or other auxiliary feature to the water source spigots and/or connectors.

Accordingly, a washing machine appliance including one or more features that allow a user to rinse out the dispenser cup at the washing machine appliance would be useful. Further, a washing machine appliance including one more features that allow a user to conveniently perform certain pretreatment activities on one or more articles to be washed by the washing machine appliance would be particularly beneficial. Moreover, a washing machine appliance including one or more features that allow a user to conveniently access the water source utilized by the washing machine appliance would be particularly advantageous.

BRIEF DESCRIPTION OF THE INVENTION

The present subject matter provides a water valve for a washing machine appliance that includes features that allow for accessories, e.g., a spray hose assembly or garden hose, to readily connect to the water valve. Aspects and advantages of the invention are set forth below in the following description, or may be obvious from the description, or may be learned through practice of the invention.

In accordance with one embodiment of the present disclosure, a washing machine appliance is provided. The washing machine appliance includes a cabinet and a tub positioned within the cabinet. The washing machine appliance also includes a basket rotatably mounted within the tub, the basket defining a wash chamber for receipt of articles for washing. The washing machine appliance further includes a water valve fluidly connected to a water source. The water valve includes one or more inlet ports, one or more outlet ports, and one or more auxiliary ports having a threaded connector. The washing machine appliance also includes a spout fluidly connected to the water valve and configured for flowing water from the water valve into one or both of the tub and the drum. In addition, the washing machine appliance includes an auxiliary assembly fluidly connected to the water valve via the threaded connector of one of the one or more auxiliary ports and configured for selectively providing a flow of water in a desired direction and location.

In accordance with another embodiment of the present disclosure, a washing machine appliance is provided. The washing machine appliance includes a cabinet and a tub positioned within the cabinet. The washing machine appliance also includes a basket rotatably mounted within the tub, the basket defining a wash chamber for receipt of articles for washing. The washing machine appliance further includes a water valve fluidly connected to a water source. The water valve includes a water valve manifold that includes one or more inlet ports, one or more outlet ports, and one or more auxiliary ports integrally formed with the water valve manifold as a unitary component, at least one of the one or more auxiliary ports having a threaded connector. The washing machine appliance further includes a spout fluidly connected to the water valve and configured for flowing water from the water valve into one or both of the tub and the drum. Moreover, the washing machine appliance includes an auxiliary assembly fluidly connected to the water valve via the threaded connector of one of the one or more auxiliary ports and configured for selectively providing a flow of water in a desired direction and location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
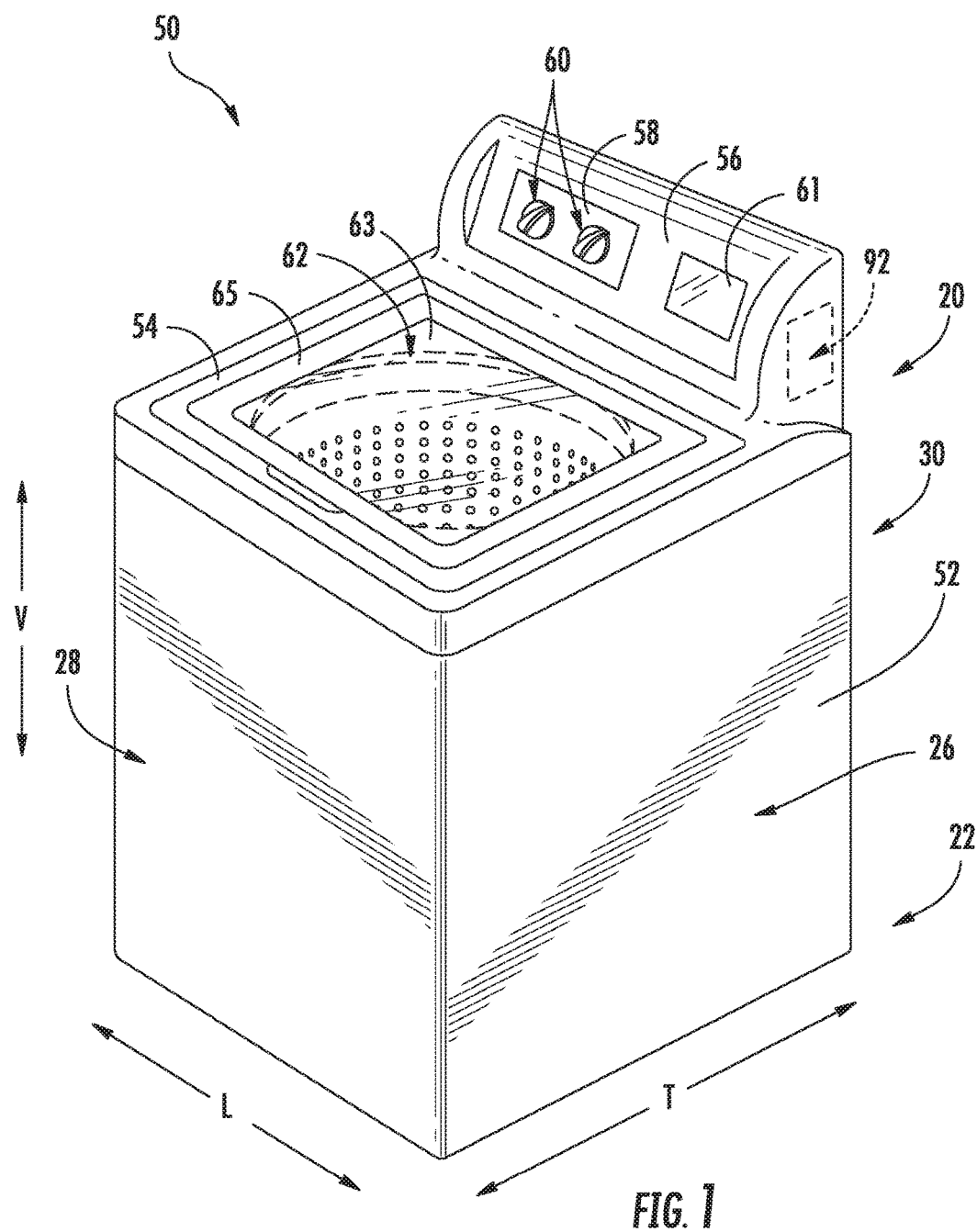
FIG. 1 provides a perspective view of a washing machine appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a washing machine appliance 50 according to an exemplary embodiment of the present subject matter. As shown, washing machine appliance 50 defines a vertical direction V, a lateral direction L, and a transverse direction T. The vertical, lateral, and transverse directions V, L, T defined by washing machine appliance 50 are mutually perpendicular and together define an orthogonal direction system. Moreover, the exemplary washing machine appliance 50 of FIG. 1 extends generally along the vertical direction V between a top end 20 and a bottom end 22, along the lateral direction L between a first side 24 (FIG. 2) and a second side 26, and along the transverse direction T between a front side 28 and a rear side 30.

As further shown in FIG. 1, washing machine appliance 50 includes a cabinet 52 including a cover 54 and a backsplash 56. Backsplash 56 extends from cover 54, and a control panel 58 including a plurality of input selectors 60 is coupled to backsplash 56. Control panel 58 and input selectors 60 collectively form a user interface input for operator selection of machine cycles and features, and in some embodiments, a display 61 indicates selected features, a countdown timer, and/or other potential items of interest to users. A lid 62 is mounted to cover 54 and is rotatable between an open position (not shown) facilitating access to a wash tub 64 (FIG. 2) located within cabinet 52 and a closed position (shown in FIG. 1) forming an enclosure over tub 64.

For this embodiment, lid 62 includes a transparent panel 63, which may be formed of, for example, glass, plastic, or any other suitable material. The transparency of panel 63 allows users to see through panel 63 and into tub 64 when lid 62 is in the closed position. In certain embodiments, panel 63 may itself generally form the lid 62. However, in other embodiments, lid 62 may include panel 63 and a frame 65 surrounding and encasing panel 63. Additionally or alternatively, in still other embodiments, panel 63 may not be transparent.

Figure 2:
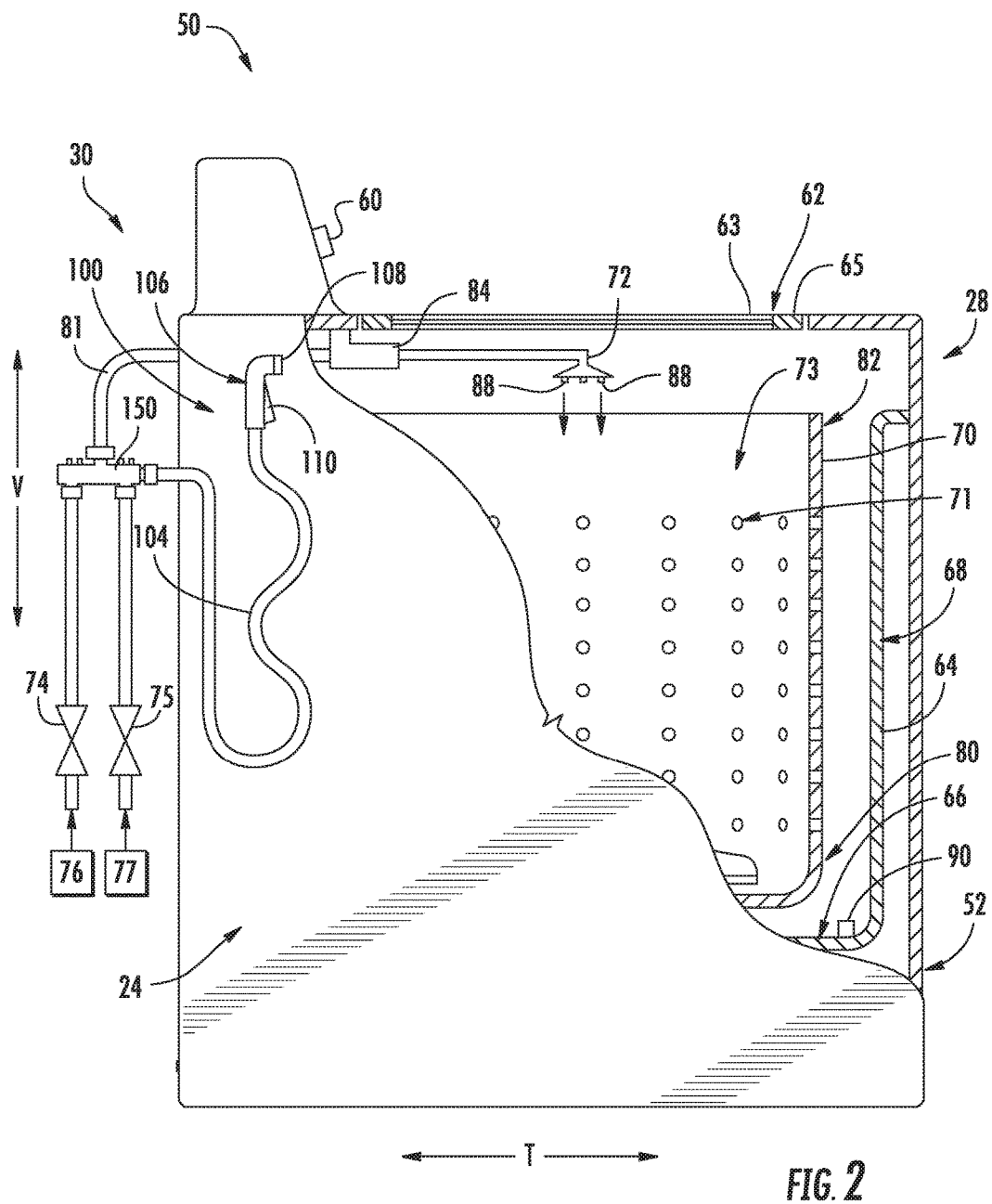
FIG. 2 provides a side, cutaway view of the exemplary washing machine appliance of FIG. 1.

FIG. 2 provides a side cutaway view of the exemplary washing machine appliance 50 of FIG. 1. As shown in FIG. 2, tub 64 is positioned within cabinet 52 and includes a bottom wall 66 and a sidewall 68. A wash drum or wash basket 70 is rotatably mounted within tub 64. In particular, basket 70 is rotatable about the vertical direction V. Thus, washing machine appliance 50 is generally referred to as a "vertical axis washing machine appliance." Basket 70 defines a wash chamber 73 for receipt of articles for washing and extends, e.g., between a bottom portion 80 and a top portion 82 along the vertical direction V. Additionally, basket 70 defines a plurality of openings or perforations 71 to facilitate fluid communication between an interior of basket 70 and tub 64.

A spout 72 is configured for flowing a liquid into one or both of tub 64 and basket 70. In particular, for this embodiment, spout 72 is positioned at or adjacent to top portion 82 of basket 70. Spout 72 is in fluid communication with a water source, or more specifically to a hot water source 76 and a cold water source 77, in order to direct liquid (e.g., water) into tub 64 and/or onto articles within chamber 73 of basket 70. Spout 72 includes apertures 88 through which water may be sprayed into the tub 64. Apertures 88 may, for example, be tubes extending from the spout 72 as illustrated, or alternatively, apertures 88 may be holes defined in the spout 72. In yet other embodiments, apertures 88 may be any other suitable openings through which water may be sprayed. Further, spout 72 may additionally include other openings, holes, etc. (not shown) through which water may be flowed, i.e., sprayed or poured, into the tub 64 and/or basket 70.

Various valves may regulate the flow of fluid through spout 72 via a supply line 81. For this embodiment, a hot water valve 74 and a cold water valve 75 are positioned along supply line 81 to flow hot water and cold water, respectively, through the supply line 81 fluidly connecting the dual water sources 76, 77 to spout 72. As used herein, the term "supply line" is used to refer generally to the one or more fluid lines, pipes, conduits, etc. provided between water sources 76, 77 and spout 72 of washing machine appliance 50.

Referring still to FIG. 2, each valve 74, 75 may be selectively adjusted between an open position allowing a flow of fluid therethrough to spout 72 and a closed position terminating or obstructing the flow of fluid therethrough to spout 72. Hot water valve 74 is in fluid communication with hot water source 76, which may be external to the washing machine appliance 50. Similarly, cold water valve 75 is in fluid communication with cold water source 77, which may also be external to the washing machine appliance 50. The cold water source 77 may, for example, be a commercial water supply, while the hot water source 76 may be, for example, a water heater appliance. Such water sources 76, 77 may supply water to washing machine appliance 50 through the respective valves 74, 75 and supply line 81.

An additive dispenser 84 is additionally provided for directing a fluid additive, such as detergent, bleach, liquid fabric softener, etc., into tub 64. For this embodiment, dispenser 84 is in fluid communication with spout 72 such that water flowing from supply line 81 to spout 72 flows through dispenser 84, mixing with the fluid additive at a desired time during operation to form a liquid or wash fluid, before being flowed into tub 64. In some embodiments, spout 72 is a separate downstream component from dispenser 84. In other embodiments, however, spout 72 and dispenser 84 may be integral, with a portion of dispenser 84 serving as the spout 72. Alternatively still, spout 72 and dispenser 84 may be separate components defining parallel flow paths from supply line 81 into tub 64 and/or basket 70. A pump assembly (not shown) is located beneath tub 64 and basket 70 for gravity assisted flow to drain tub 64.

Various sensors may additionally be included in the washing machine appliance 50. For example, a pressure sensor 90 may be positioned in the tub 64 as illustrated. Any suitable pressure sensor 90, such as an electronic sensor, a manometer, or another suitable gauge or sensor, may be utilized. The pressure sensor 90 may generally measure the pressure of water in the tub 64. This pressure can then be utilized to estimate the height or level of water in the tub 64. Additionally, a suitable speed sensor (not shown) can be provided to measure rotational speed of basket 70. Other suitable sensors, such as temperature sensors, etc., may additionally be provided in washing machine appliance 50.

Operation of washing machine appliance 50 is controlled by a processing device or controller 92 (shown in phantom in FIG. 1), that is operatively coupled to the input selectors 60 located on washing machine backsplash 56 for user manipulation to select washing machine cycles and features. Controller 92 may further be operatively coupled to various other components of appliance 50, such as valves 74, 75, pressure sensor 90, and other suitable sensors, etc. In response to user manipulation of the input selectors 60, controller 92 may operate the various components of washing machine appliance 50 to execute selected machine cycles and features.

Controller 92 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 92 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 92 via one or more signal lines or shared communication busses.

In an illustrative aspect of the present disclosure, a load of laundry articles may be loaded into chamber 73 of basket 70 and washing operation initiated through operator manipulation of control input selectors 60. Tub 64 may then be filled with water and mixed with detergent to form a liquid or wash fluid. Valves 74, 75 can be opened to initiate a flow of water into tub 64 via spout 72, and tub 64 can be filled to the appropriate level for the amount of articles being washed. Once tub 64 is properly filled with wash fluid, the contents of the basket 70 are agitated with an agitation element (not shown) or by movement of the basket 70 for cleaning of articles in basket 70. For example, the agitation element and/or basket 70 may be moved back and forth in an oscillatory motion.

After the agitation phase of the wash cycle is completed, tub 64 is drained. Laundry articles can then be rinsed by again adding fluid to tub 64, and depending on the particulars of the cleaning cycle selected by a user, the agitation element and/or basket 70 may again provide agitation within basket 70. One or more spin cycles may also be used. In particular, a spin cycle may be applied after the wash cycle and/or after the rinse cycle in order to wring wash fluid from the articles being washed. During a spin cycle, basket 70 is rotated at relatively high speeds.

It should be appreciated, however, that while described in the context of a specific embodiment of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Referring still to FIG. 2, washing machine appliance 50 further includes an auxiliary assembly 100, which is a spray hose assembly in this embodiment. As shown, auxiliary assembly 100 is fluidly connected to the water source and configured for selectively providing a flow of water in a desired direction and location. More particularly, for this embodiment, auxiliary assembly 100 is fluidly connected to the water source via a water inlet valve or water valve 150 positioned outside cabinet 52. Water valve 150 is fluidly connected to the water source and is positioned along supply line 81 downstream of valves 74, 75. As further shown, spout 72 is also fluidly connected to the water source via water valve 150.

Auxiliary assembly 100 includes a hose 104, which for the embodiment depicted is a flexible hose, and a handle 106. Handle 106 is attached to hose 104 at a distal end of hose 104. Handle 106 includes an activation member and a nozzle 108. The activation member is configured to selectively allow a flow of water through the nozzle 108 and nozzle 108 is configured to direct such flow of water in a desired direction. For the embodiment depicted, the activation member is a trigger 110 on handle 106 that operates an internal valve (not shown) to allow a flow of water therethrough.

For the embodiment of FIG. 2, at least a portion of auxiliary assembly 100 extends outside cabinet 52 and handle 106 of auxiliary assembly 100 is removably positioned on cabinet 52. More particularly, for the embodiment depicted, handle 106 of auxiliary assembly 100 is removably mounted on cabinet 52 at second side 26 of washing machine appliance 50 proximate to top end 20 and rear side 30 of washing machine appliance 50. Accordingly, in such an exemplary embodiment, handle 106 of auxiliary assembly 100 may be conveniently stored away when not in use.

Handle 106 of auxiliary assembly 100 may be removably mounted on cabinet 52 of washing machine appliance 50 in any suitable manner. Although not depicted, washing machine appliance 50 may, for example, include a holster for handle 106 of auxiliary assembly 100 or a hook for handle 106 of auxiliary assembly 100. Alternatively, washing machine appliance 50 may include a hook on cabinet 52 over which hose 104 of auxiliary assembly 100 may be draped. Alternatively still, handle 106 of auxiliary assembly 100 may include a magnetic portion such that handle 106 of auxiliary assembly 100 may be removably mounted at any desired location on cabinet 52 of washing machine appliance 50. Accordingly, it should be appreciated that the terms "positioned on" and "mounted on" with reference to handle 106 and cabinet 52 are used generally to mean handle 106 is attached to cabinet 52 or positioned adjacent to cabinet 52 and includes embodiments where one or more intermediate components are positioned between handle 106 and cabinet 52 to facilitate the positioning or mounting of handle 106 to cabinet 52.

Hose 104 of auxiliary assembly 100 may define any suitable length. For example, although auxiliary assembly 100 is depicted schematically in FIG. 2 with hose 104 defining a length (i.e., between water valve 150 and handle 106) approximately equal to a width of cabinet 52 along transverse direction T, in other exemplary embodiments, hose 104 may instead define a length greater than the width of cabinet 52 along the transverse direction T. For example, in other embodiments, hose 104 may define a length approximately twice as wide, or approximately three times as wide, as cabinet 52 along the transverse direction T.

A washing machine appliance including the exemplary auxiliary assembly 100 of FIG. 2 may allow a user to, e.g., conveniently wash out dispenser 84 over tub 64 and basket 70 to remove any unwanted residue from wash additives contained therein. Moreover, a washing machine appliance including the exemplary auxiliary assembly 100 of FIG. 2 may allow a user to, e.g., conveniently perform certain pretreatment activities on articles for washing, fill a bucket with water, wash a pet, etc.

Figure 3:
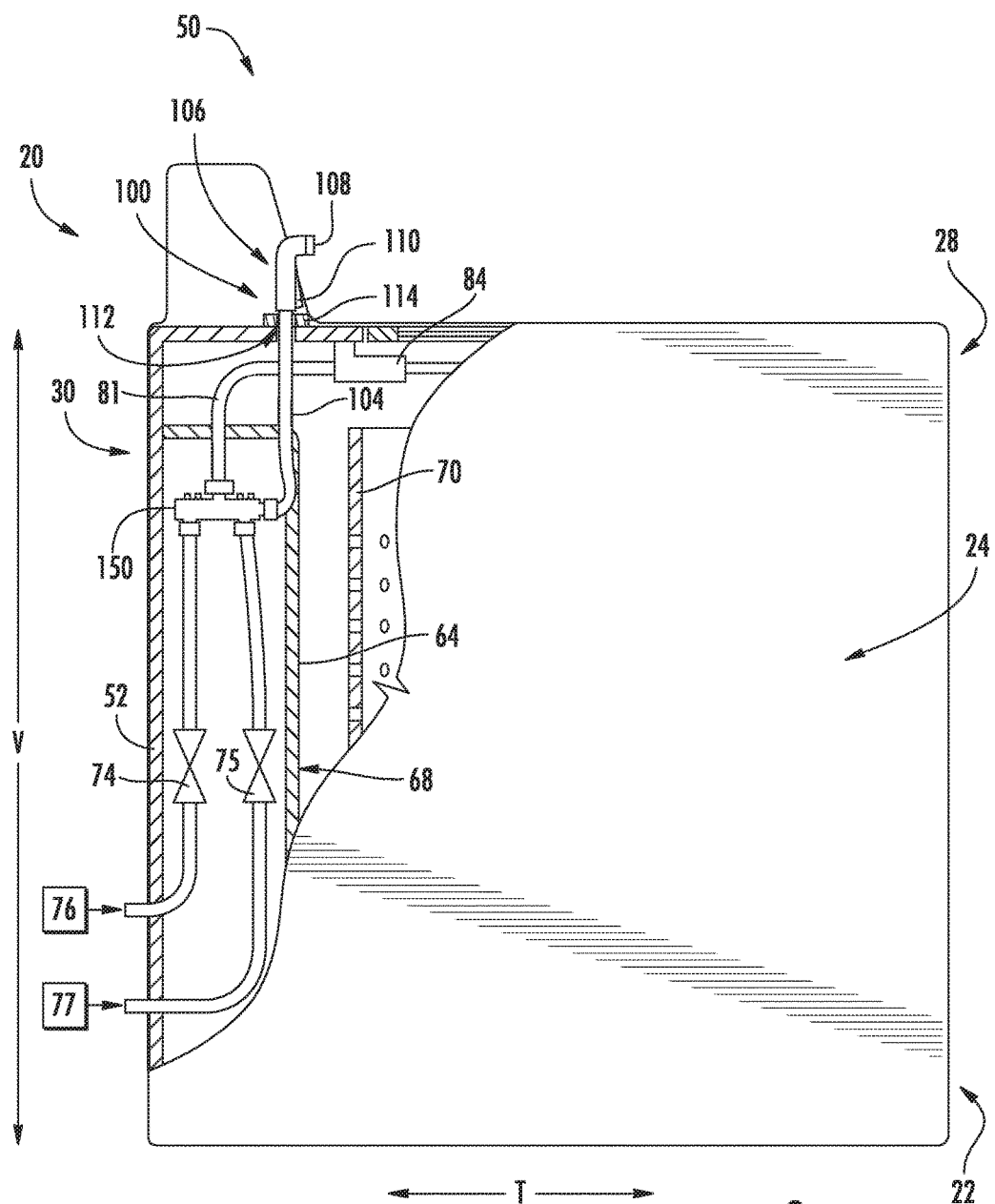
FIG. 3 provides a side, cutaway view of a washing machine appliance in accordance with another exemplary embodiment of the present subject matter.

Referring now to FIG. 3, a washing machine appliance in accordance with another exemplary embodiment of the present disclosure is provided. The exemplary washing machine appliance 50 of FIG. 3 is configured in a similar manner as the washing machine appliance 50 of FIG. 2 and, accordingly, the same or similar numbering refers to the same or similar part.

By contrast with the washing machine appliance of FIG. 2, washing machine appliance 50 of FIG. 3 includes water valve 150 positioned within cabinet 52 of washing machine appliance 50. Accordingly, at least a portion of hose 104 of auxiliary assembly 100 may be positioned within cabinet 52 of washing machine appliance 50. For example, in the embodiment depicted, cabinet 52 defines an opening 112 on top end 20 of washing machine appliance 50 proximate to rear side 30. Additionally, washing machine appliance 50 includes a washer 114 positioned on cabinet 52 around opening 112 to provide a close fit with hose 104 and prevent handle 106 from extending through opening 112. Handle 106 of auxiliary assembly 100 is depicted resting on washer 114, although in other embodiments, washing machine appliance 50 may not include washer 114, and handle 106 may be positioned, e.g., directly on cabinet 52. The embodiment of FIG. 3 may allow hose 104 of auxiliary assembly 100 to be slidably positioned in opening 112, such that hose 104 may extend or retract through opening 112, and handle 106 may be removably positioned on the top end 20 of washing machine appliance 50.

In other exemplary embodiments, auxiliary assembly 100 may be positioned and/or mounted at any other suitable location allowing for a user to access auxiliary assembly 100 when desired. For example, handle 106 of auxiliary assembly 100 may instead be removably positioned on cabinet 52 proximate front end 28 of washing machine appliance 50. Moreover, in still other embodiments, cabinet 52 of washing machine appliance 50 may, e.g., define a compartment (not shown) housing auxiliary assembly 100. In such an embodiment, handle 106 may be removably positioned on cabinet 52 within the compartment and cabinet 52 may further include a cover over such compartment, such that auxiliary assembly 100 is stored away when not in use.

Further, for the exemplary embodiment depicted, an operator or user of washing machine appliance 50 may be required to manually feed hose 104 of auxiliary assembly 100 through opening 112 in cabinet 52 in order to retract hose 104 of auxiliary assembly 100 into cabinet 52. However, in other embodiments, washing machine appliance 50 may further include a retraction member (not shown) configured to assist a user in retracting hose 104 of auxiliary assembly 100 into cabinet 52. For example, such a retraction member may bias the hose 104 of auxiliary assembly 100 into a retracted position (as depicted in FIG. 3).

Figure 4:
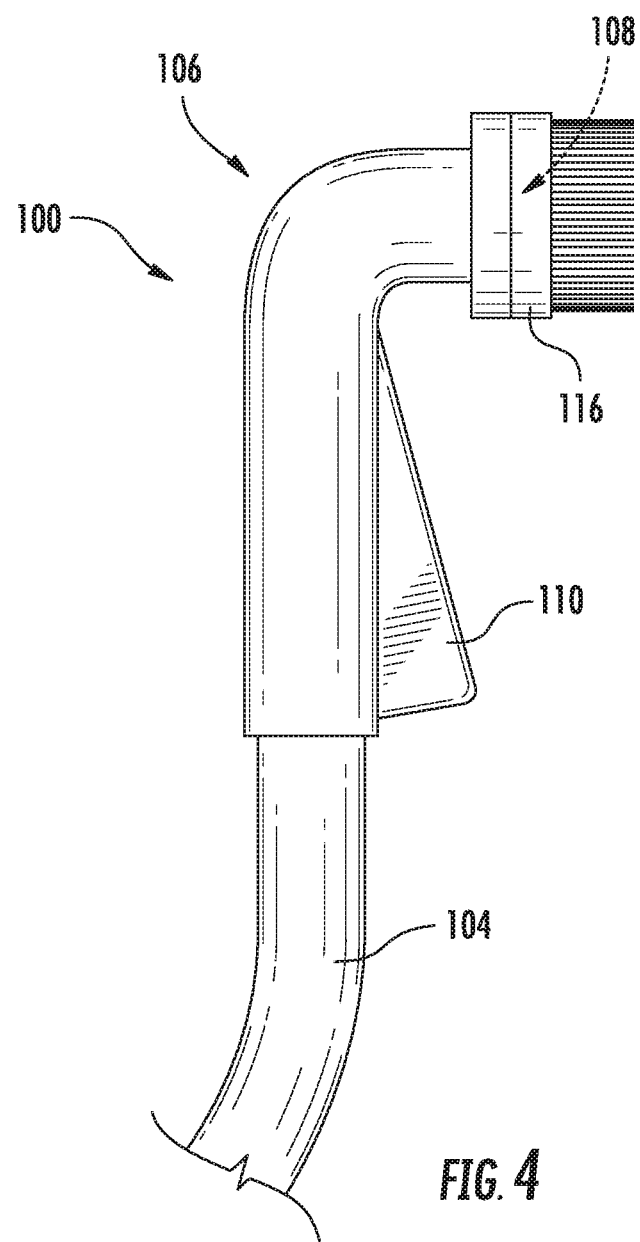
FIG. 4 provides a side view of an exemplary auxiliary assembly in accordance with an exemplary embodiment of the present subject matter.

FIG. 4 provides a close up view of handle 106 of auxiliary assembly 100 in accordance with an exemplary embodiment of the present disclosure. Handle 106 of FIG. 4 similarly includes an activation member and nozzle 108. The activation member is configured to selectively allow a flow of water through nozzle 108, and for the embodiment depicted, the activation member is configured as trigger 110 on handle 106. Trigger 110 may be depressed into or inwardly towards handle 106 to allow a flow of water through nozzle 108.

Moreover, auxiliary assembly 100 of FIG. 4 includes an attachment member 116. Attachment member 116 is removably attached to handle 106 over nozzle 108. More particularly, for the embodiment of FIG. 4, attachment member 116 is a brush attachment removably attached to handle 106 over nozzle 108. Attachment member 116 may be removably attached to handle 106 in any suitable manner. For example, attachment member 116 may utilize a rotationally and axially engaging attachment mechanism, such as with corresponding threaded components, or alternatively may use a suitable quick-release attachment configuration. Auxiliary assembly 100 including the brush attachment removably attached to handle 106 over nozzle 108 may assist a user in, e.g., one or more pretreatment activities of articles for washing including undesired stains or marks.

It should be appreciated, however, that in other embodiments, any other suitable attachment member 116 may be provided. For example, in other embodiments, attachment member 116 may be a spray tip, such as a flat spray tip, a concentrated flow spray tip, or shower-type spray tip. Moreover, in still other embodiments, the attachment member 116 may include a plurality of spray tips selectively accessible by, e.g., rotating a portion of such attachment member 116. Further, although handle 106 defines a generally bent shape in the embodiment depicted in FIG. 4, in other exemplary embodiments, handle 106 may instead define any other suitable shape, such as a linear shape.

Figure 5:
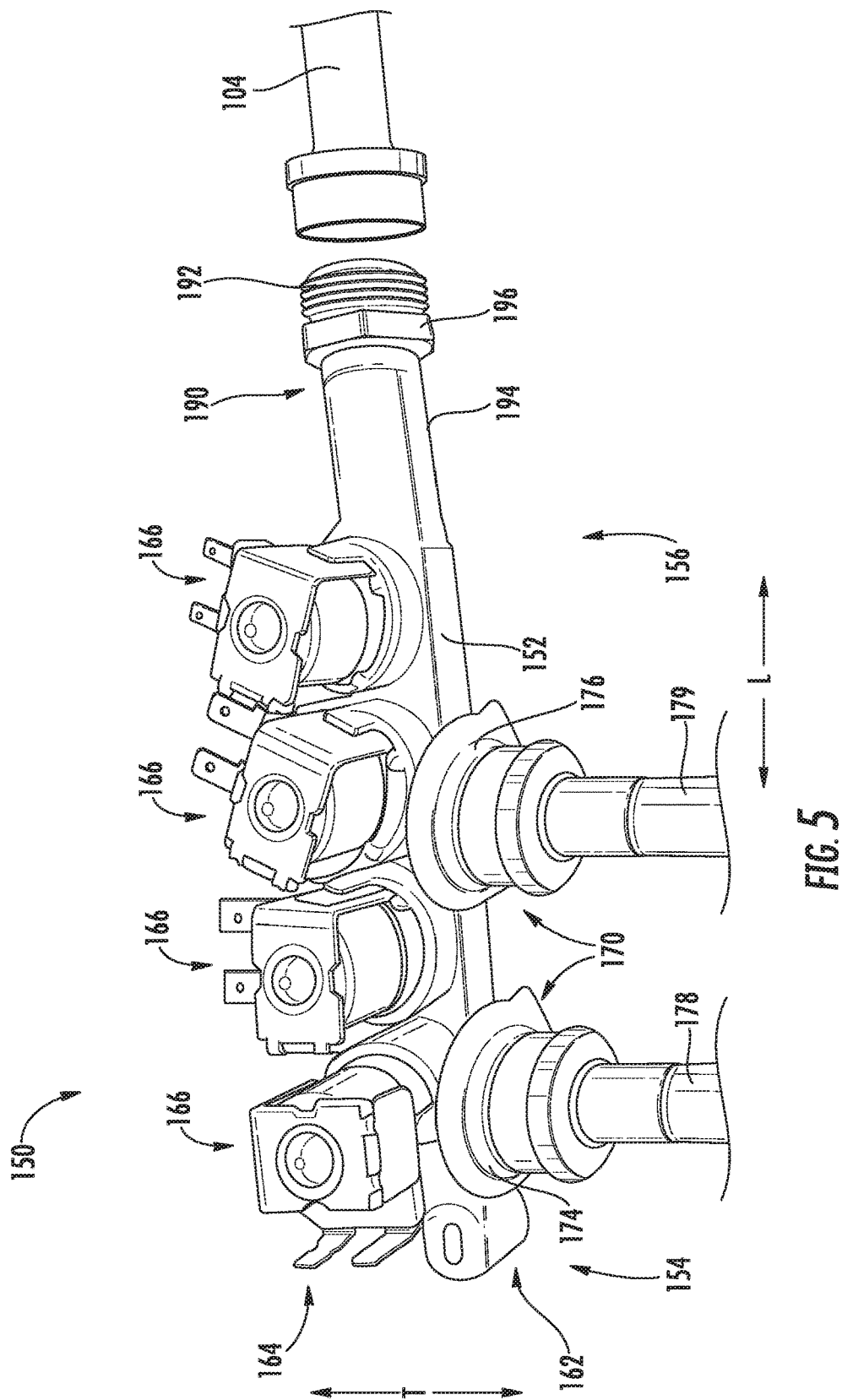
FIG. 5 provides a close up, perspective view of an exemplary water valve in accordance with an exemplary embodiment of the present subject matter.
Figure 6:
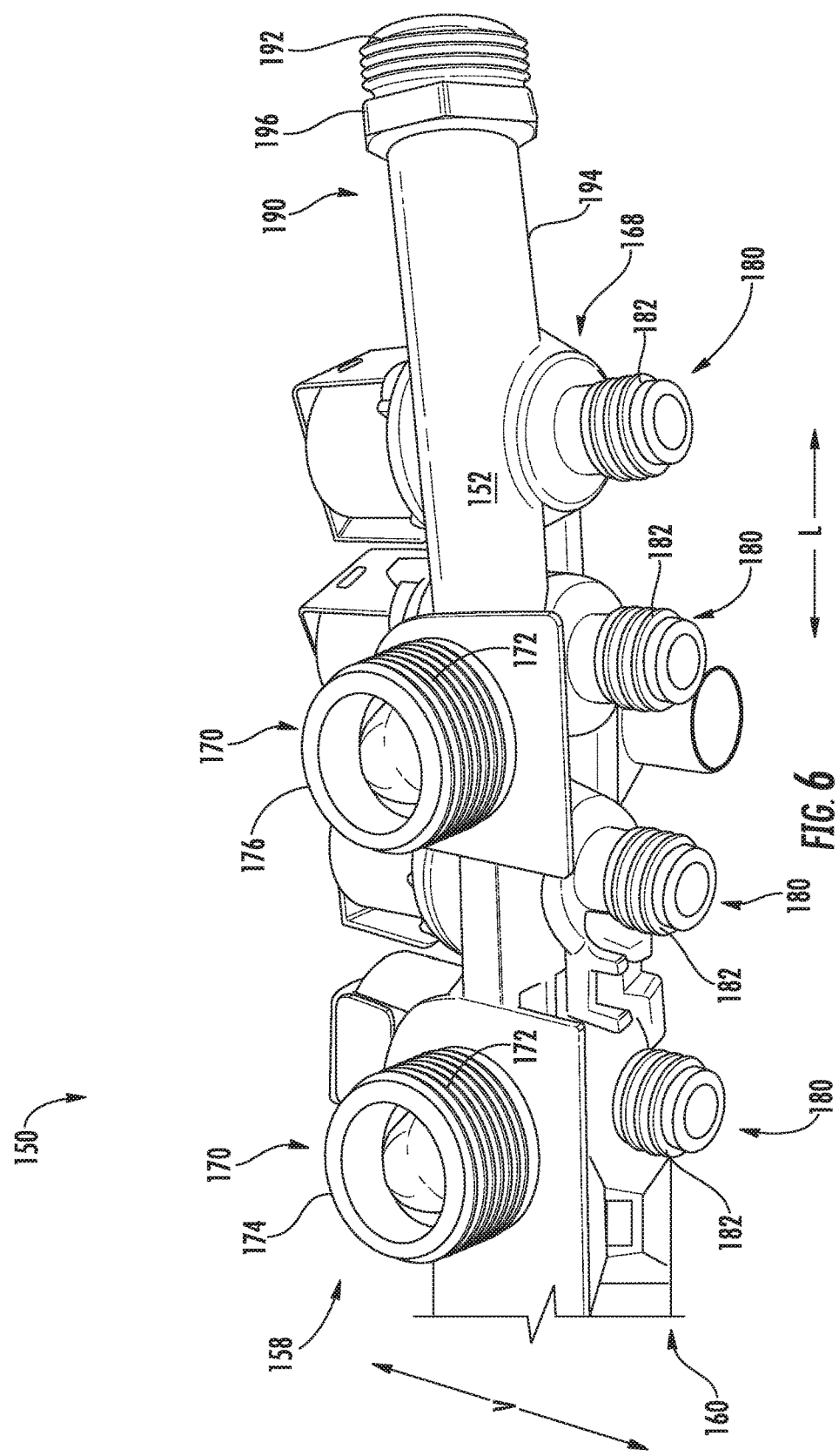
FIG. 6 provides another close up, perspective view of the water valve of FIG. 5.

FIGS. 5 and 6 provide close up, perspective views of water valve 150 in accordance with an exemplary embodiment of the present subject matter. In particular, FIG. 5 provides a top perspective view of water valve 150 and FIG. 6 provides a bottom perspective view thereof. As shown, water valve 150 includes a housing or water valve manifold 152. Water valve manifold 152 extends between a first side 154 and a second side 156 along the lateral direction L (FIG. 5), between a top portion 158 and a bottom portion 160 along the vertical direction V (FIG. 6), and between a front side 162 and a back side 164 along the transverse direction T (FIG. 5).

Water valve manifold 152 includes one or more inlet ports 170 integrally formed with water valve manifold 152. For this embodiment, water valve manifold 152 includes a hot water inlet port 174 and a cold water inlet port 176. A hot water conduit 178 is shown connecting to the hot water inlet port 174 and a cold water conduit 179 is shown connecting to the cold water inlet port 176 (FIG. 5). Hot water conduit 178 extends from hot water valve 74 (FIG. 2) to provide fluid communication between hot water valve 74 and water valve 150. In a similar fashion, cold water conduit 179 extends from cold water valve 75 (FIG. 2) to provide fluid communication between cold water valve 75 and water valve 150. Hot water inlet port 174 has a threaded connector 172 formed integrally with water valve manifold 152 (FIG.

6). Likewise, cold water inlet port 176 has a threaded connector 172 formed integrally with water valve manifold 152 (FIG. 6).

As shown particularly in FIG. 6, water valve manifold 152 also includes one or more outlet ports 180 integrally formed with water valve manifold 152. For this embodiment, water valve manifold 152 includes four (4) outlet ports 180. Each of the outlet ports 180 are configured for connection with supply line 81 (FIG. 2). As further shown in FIG. 6, outlet ports 180 each have smaller diameters than inlet ports 170. Outlet ports 180 have threaded connectors 182 to which conduits of supply line 81 can be in threaded engagement.

As further shown in FIGS. 5 and 6, water valve manifold 152 also includes one or more auxiliary ports 190 integrally formed with water valve manifold 152. For this embodiment, water valve manifold 152 includes a single auxiliary port 190 extending from second side 156 (FIG. 5) of water valve manifold 152 along the lateral direction L. Auxiliary port 190 includes a threaded connector 192 sized as a universal connector such that standard size hoses can be connected with water valve 150. In some embodiments, threaded connector 192 is sized such that a garden hose can be connected to water valve 150. For instance, in some exemplary embodiments, auxiliary port 190 includes a threaded connector sized to receive a hose connector of a hose having about a ⅝ inch inner diameter. In other exemplary embodiments, auxiliary port 190 includes a threaded connector sized to receive a hose connector of a hose having about a ¾ inch inner diameter. In yet other exemplary embodiments, auxiliary port 190 includes a threaded connector sized to receive a hose connector of a hose having about a ½ inch inner diameter. In yet further exemplary embodiments, auxiliary port 190 includes a threaded connector sized to receive a hose connector of a hose having about a ⅜ inch inner diameter. In yet other embodiments, threaded connector 192 is the same or substantially the same size as the threaded connectors 172 of inlet ports 170. Threaded connector 192 can be formed of a plastic material, for example. Auxiliary port 190 also includes a stop 196 to prevent a hose connector from being over threaded past threaded connector 192.

Figure 7:
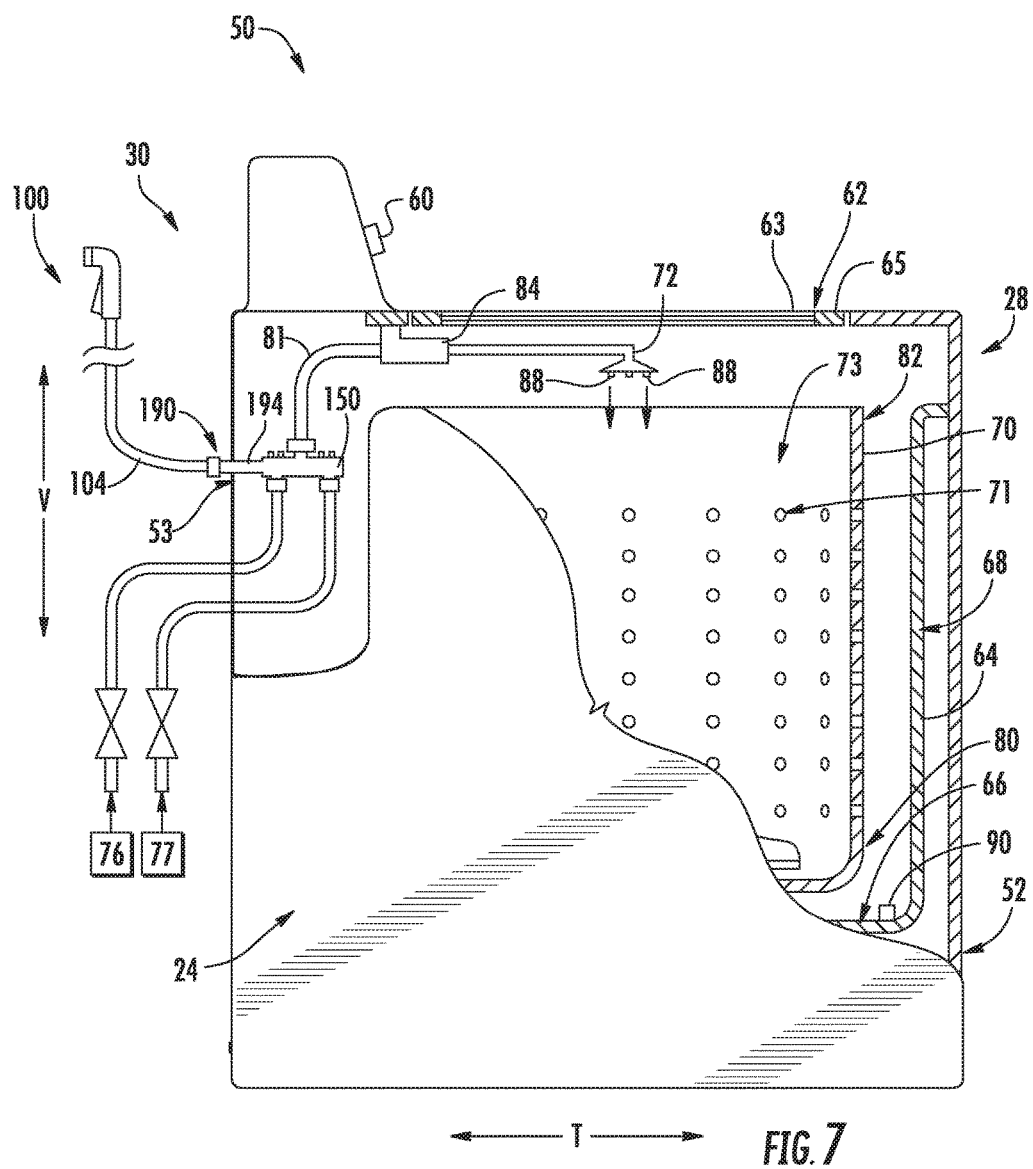
FIG. 7 provides a side, cutaway view of a washing machine appliance in accordance with yet another exemplary embodiment of the present subject matter.

Auxiliary port 190 includes an extension portion 194 disposed between a main body 168 of water valve manifold 152 and threaded connector 192 of auxiliary port 190, and more particularly between main body 168 (FIG. 6) and stop 196. Extension portion 194 extends a distance so that threaded connector 192 of auxiliary port 190 can be more easily accessible to users. For instance, by way of example, FIG. 7 provides a side, cutaway view of a washing machine appliance in accordance with yet another exemplary embodiment of the present subject matter. More particularly, FIG. 7 depicts water valve 150 positioned within cabinet 52 and extension portion 194 of auxiliary port 190 extending a distance sufficient to extend through an opening 53 defined by cabinet 52 such that threaded connector 192 (covered by a hose connector of hose 104 in FIG. 7) of auxiliary port 190 is positioned outside of cabinet 52. This may allow a user to connect to auxiliary port 190 of water valve 150 without disassembling washing machine appliance 50, for example. Although extension portion 194 is shown in a straight or linear configuration, extension portion 194 can have other suitable geometries, such as e.g., an elbow shape.

Returning to FIGS. 5 and 6, water valve manifold 152 can be formed of any suitable material. Preferably, water valve manifold 152 and its integrally formed ports are formed of a plastic material. For instance, water valve manifold 152 can be formed of a thermoset or thermoplastic material. In some embodiments, water valve manifold 152 and its integrally formed ports are integrally formed as a unitary component. Water valve manifold 152 can be manufactured via any suitable process. For instance, in some embodiments, water valve manifold 152 and its integrally formed ports are injection molded to form the unitary manifold component. In yet other embodiments, water valve manifold 152 and its integrally formed ports are injection molded in a single shot to form the unitary manifold component. This reduces the number of components of water valve 150 and makes manufacturing of water valve manifold 152 more efficient and cost effective. In some embodiments, water valve manifold 152 and its integrally formed ports are additively manufactured to form the unitary manifold component.

As shown in FIG. 5, the flow of water through water valve 150 is controlled by solenoids 166 which are in turn controlled by controller 92 (FIG. 1). Controller 92 is operatively coupled with solenoids 166 in electrical communication such that solenoids 166 can actuate the actuators of water valve 150 to selectively control fluid therethrough. In particular, upon receiving one or more signals from controller 92, solenoids 166 can actuate their respective actuators to control the fluid flow (e.g., the rate and amount of fluid) and temperature of the water within the valve and/or exiting outlet ports 180. The internal actuators of water valve 150 can be any suitable type of actuator, including e.g., plunger actuators, pivoted-armature actuators, rocker actuators, etc.

Figure 8:
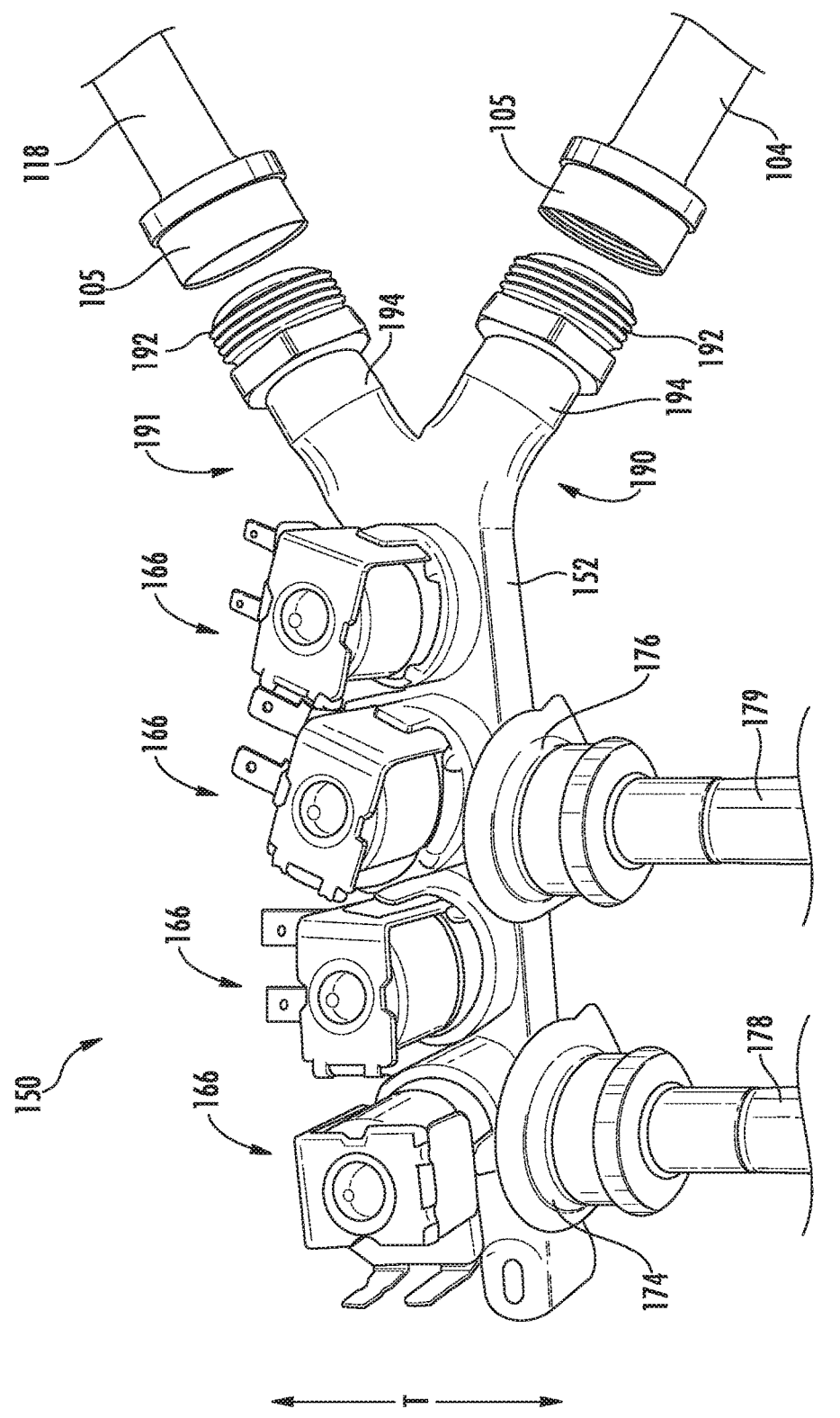
FIG. 8 provides another close up, perspective view of an exemplary water valve in accordance with an exemplary embodiment of the present subject matter.

FIG. 8 provides another close up, perspective view of another exemplary water valve in accordance with an exemplary embodiment of the present subject matter. The exemplary water valve 150 of FIG. 8 is configured in a similar manner as the water valve of FIGS. 5 and 6, and accordingly, the same or similar numbering refers to the same or similar part.

By contrast with the water valve of FIGS. 5 and 6, water valve 150 of FIG. 8 includes two auxiliary ports 190 extending from water valve manifold 152 in a V-shaped configuration. Accordingly, multiple auxiliary assemblies 100 can be connected with water valve 150. This may provide additional convenience to a user. As one example, as depicted in FIG. 8, one of the auxiliary ports 190 can be connected with hose 104 of a spray hose assembly. As shown, hose connector 105 of hose 104 can be in threaded engagement with the threaded connector 192 of auxiliary port 190. The other auxiliary port, or second auxiliary port 191, can be connected to a garden hose 118 that can be used, for example, to water the yard, wash a vehicle, or wash a pet. As shown, hose connector 105 of garden hose 118 can be in threaded engagement with threaded connector 192 of auxiliary port 190. It will be appreciated that in some embodiments, water valve 150 can have more than two auxiliary ports. For example, water valve 150 can have three (3) auxiliary ports, four (4) auxiliary ports, five (5) auxiliary ports 190, etc.

Figure 9:
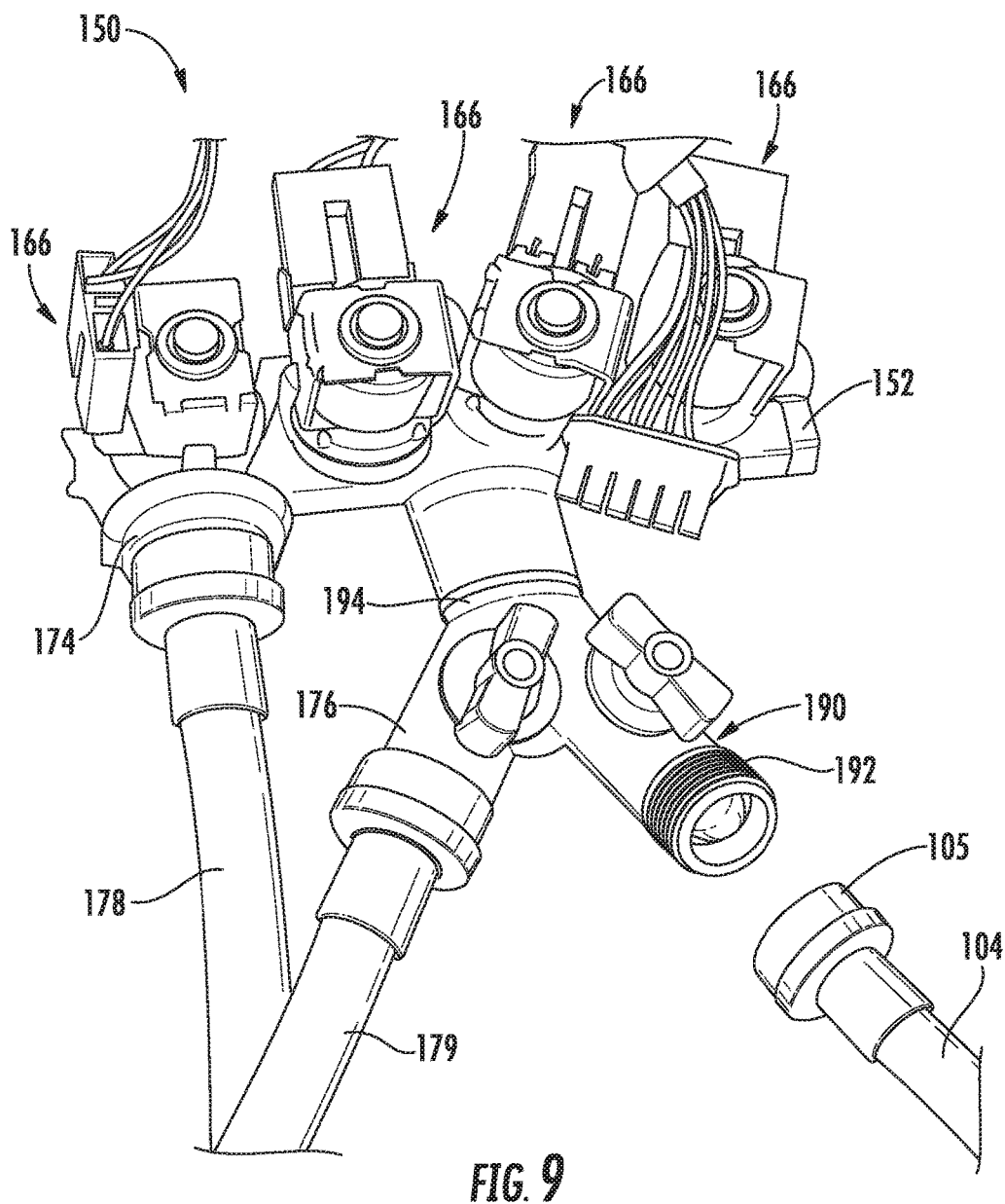
FIG. 9 provides yet another close up, perspective view of an exemplary water valve in accordance with an exemplary embodiment of the present subject matter.

FIG. 9 provides yet another close up, perspective view of an exemplary water valve in accordance with an exemplary embodiment of the present subject matter. The exemplary water valve 150 of FIG. 9 is configured in a similar manner as the water valve of FIGS. 5 and 6, and accordingly, the same or similar numbering refers to the same or similar part.

By contrast with the water valve of FIGS. 5 and 6, water valve 150 of FIG. 9 includes extension portion 194 shaped in a general V-shape that includes both cold water inlet port 176 and auxiliary port 190. For this embodiment, extension portion 194 fluidly connects cold water inlet port 176 with water valve 150 and cold water inlet port 176 with auxiliary port 190. Moreover, for this embodiment, in the event it is desired to flow cold water to a connected auxiliary assembly while washing machine appliance is not in use, solenoids 166 can be controlled by controller 92 (FIG. 1) to actuate such that water flows from cold water conduit 179 into cold water inlet port 176 and then directly into auxiliary port 190 and downstream to the connected auxiliary assembly. In this way, cold water can more quickly flow to the auxiliary assembly and the current temperature and pressure of the water within water valve 150 is undisturbed.

In other exemplary embodiments, the water valve can include an extension portion shaped in a general V-shape that includes both a hot water inlet port and an auxiliary port. In such embodiments, in the event it is desired to flow hot water to a connected auxiliary assembly while washing machine appliance is not in use, the solenoids of the water valve can be controlled by a controller to actuate such that water flows from the hot water conduit into the hot water inlet port and then directly into auxiliary port and downstream to a connected auxiliary assembly. In this way, hot water can more quickly flow to the connected auxiliary assembly and the current temperature and pressure of the water within the water valve is undisturbed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
    a cabinet;
    a tub positioned within the cabinet;
    a basket rotatably mounted within the tub, the basket defining a wash chamber for receipt of articles for washing;
    a water valve positioned in the cabinet, the water valve fluidly connected to a water source and comprising one or more inlet ports, one or more outlet ports, and one or more auxiliary ports having a threaded connector;
    a spout fluidly connected to the water valve and configured for flowing water from the water valve into one or both of the tub and the basket; and
    an auxiliary assembly fluidly connected to the water valve via the threaded connector of one of the one or more auxiliary ports and configured for selectively providing a flow of water in a desired direction and location,
    wherein at least one of the one or more auxiliary ports comprises an extension portion disposed between a main body of the water valve manifold and the threaded connector of the auxiliary port, wherein the extension portion extends a distance sufficient to extend through the cabinet such that the threaded connector is positioned outside of the cabinet.

2. The washing machine appliance of claim 1, wherein the water valve comprises:
    a water valve manifold, and wherein the one or more inlet ports, the one or more outlet ports, and the one or more auxiliary ports are integrally formed with the water valve manifold.

3. The washing machine appliance of claim 1, wherein the auxiliary assembly is a spray hose assembly comprising a hose and a handle attached to the hose, the spray hose assembly configured for selectively providing the flow of water in the desired direction and location.

4. The washing machine appliance of claim 3, wherein the handle of the spray hose assembly is removably mounted to the cabinet.

5. The washing machine appliance of claim 3, wherein the handle of the spray hose assembly is removably mounted to the cabinet at a side portion of the washing machine appliance.

6. The washing machine appliance of claim 3, wherein cabinet defines an opening and wherein at least a portion of the spray hose assembly retractably extends through the opening.

7. The washing machine appliance of claim 1, wherein the water valve manifold comprises at least two auxiliary ports.

8. The washing machine appliance of claim 1, wherein the threaded connector of the one or more auxiliary ports is sized to receive a hose connector of a hose having about a ⅝ inch inner diameter.

9. The washing machine appliance of claim 1, wherein the threaded connector of the one or more auxiliary ports is sized to receive a hose connector of a hose having about a ¾ inch inner diameter.

10. The washing machine appliance of claim 1, wherein the water valve is injection molded in one shot.

11. The washing machine appliance of claim 1, wherein the water valve is comprised of a plastic material.

12. The washing machine appliance of claim 1, wherein the water valve manifold comprises at least two auxiliary ports, and wherein a garden hose is attached to one of the auxiliary ports.

13. A washing machine appliance comprising:
    a cabinet;
    a tub positioned within the cabinet;
    a basket rotatably mounted within the tub, the basket defining a wash chamber for receipt of articles for washing;
    a water valve in the cabinet that is fluidly connected to a water source and comprising a water valve manifold comprising one or more inlet ports, one or more outlet ports, and one or more auxiliary ports integrally formed with the water valve manifold as a unitary component, at least one of the one or more auxiliary ports having a threaded connector;
    a spout fluidly connected to the water valve and configured for flowing water from the water valve into one or both of the tub and the drum; and
    an auxiliary assembly fluidly connected to the water valve via the threaded connector of one of the one or more auxiliary ports and configured for selectively providing a flow of water in a desired direction and location,
    wherein at least one of the one or more auxiliary ports comprises an extension portion disposed between a main body of the water valve manifold and the threaded connector of the auxiliary port, wherein the extension portion extends a distance sufficient to extend through the cabinet such that the threaded connector is positioned outside of the cabinet.

14. The washing machine appliance of claim 13, wherein the water inlet valve is injection molded in one shot.

15. The washing machine appliance of claim 13, wherein the water valve manifold comprises at least two auxiliary ports.

16. The washing machine appliance of claim 15, wherein at least two auxiliary assemblies are fluidly connected to the water valve via the at least two auxiliary ports.

* * * * *